US006740287B2

(12) United States Patent
Billiet et al.

(10) Patent No.: US 6,740,287 B2
(45) Date of Patent: May 25, 2004

(54) METHOD FOR MAKING ARTICLES FROM NANOPARTICULATE MATERIALS

(76) Inventors: Romain Louis Billiet, 135A Malacca Street, Penang (MY), 10400; Hanh T. Nguyen, 135A Malacca Street, Penang (MY), 10400

( * ) Notice: Subject to any disclaimer, the term of this patent is extended or adjusted under 35 U.S.C. 154(b) by 0 days.

(21) Appl. No.: 10/078,070

(22) Filed: Feb. 11, 2002

(65) Prior Publication Data

US 2002/0190441 A1 Dec. 19, 2002

Related U.S. Application Data

(60) Provisional application No. 60/270,180, filed on Feb. 22, 2001.

(51) Int. Cl.$^7$ .............................. B28B 1/00; B22F 1/00
(52) U.S. Cl. ...................... 264/669; 264/656; 264/670; 419/30; 419/33; 419/35
(58) Field of Search ................................ 264/628, 656, 264/669, 670; 419/2, 1, 23, 30, 33, 35, 36, 37

(56) References Cited

U.S. PATENT DOCUMENTS

| | | | |
|---|---|---|---|
| 2,939,199 A | | 6/1960 | Strivens |
| 4,006,025 A | | 2/1977 | Swank et al. |
| 4,197,118 A | | 4/1980 | Wiech, Jr. |
| 5,267,854 A | * | 12/1993 | Schmitt .......................... 433/8 |
| 5,314,658 A | | 5/1994 | Meendering et al. |
| 6,472,459 B2 | * | 10/2002 | Morales et al. ............. 524/439 |

* cited by examiner

*Primary Examiner*—Christopher A. Fiorilla
(74) *Attorney, Agent, or Firm*—Foley and Lardner

(57) ABSTRACT

A method of fabricating nanostructure bodies by integrating the steps of attriting precursor nanometer-sized particulate materials, desorbing the exposed surfaces of the attrited nanoparticulates, adsorbing a surfactant on at most 50% of the desorbed surfaces and dispersing the surfactant-coated nanoparticulates in an organic matrix to form a homogeneous thermoplastic compound from which green bodies are shaped, dewaxed and sintered.

6 Claims, No Drawings

METHOD FOR MAKING ARTICLES FROM NANOPARTICULATE MATERIALS

CROSS-REFERENCE TO RELATED APPLICATIONS

This application claims priority to U.S. Provisional Patent Application Serial No. 60/270,180 filed on Feb. 22, 2001.

This invention is related to co-pending U.S. patent application Ser. No. 09/962,526 filed on Sep. 20, 2001 entitled: 'Method For Controlling The Dimensions Of Bodies Made From Sinterable Materials'.

REFERENCES CITED

U.S. Patent Documents

| 2,939,199 | 09/1960 | Strivens | 264/63 |
| 4,006,025 | 02/1977 | Swank, et al. | 430/567 |
| 4,197,118 | 04/1980 | Wiech | 264/63 |
| 5,314,658 | 05/1994 | Meendering, et al. | 419/33 |

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

1. Field of Invention

The present invention relates to the fabrication of articles from nanoparticulate materials. More particularly, the present invention relates to a method to overcome the problems of the prior art in controlling aggregation, contamination and pyrophoricity during handling of nanoparticulate materials and the fabrication of articles therefrom.

2. Description of Prior Art

In a broad sense, nanomaterials, nanocrystalline or nanostructured materials or simply nanostructures refer to dense materials with grain sizes in the nanometer (one billionth of a meter) range. The designation 'nanoparticulates' is generally applied to any particulate matter with an average dimension below one micrometer. In the literature, the terms nanoparticulates, submicrometer powders, nanopowders, nanoscale powders or nanocrystalline powders are often used interchangeably. The terms nanosuspension or nanodispersion usually refer to suspensions of discrete nanoparticulates, in either a liquid or in a solid matrix.

Nanoscale powders are not new. The use of lampblack, a carbon nanoscale powder with particle sizes in the 10–100 nm, to make Chinese ink, predates the Christian era by thousands of years. Nanoscale metal oxides have been used in the paint industry for centuries, whereas nanoscaled silica powders are used as filler additives to tailor the rheological properties of a variety or organic suspensions. In the hard-metal industry ultrafine carbide and nitride powders are used to make cutting tools with increased strength and extended economic life over those produced from conventional powders. More recently, the use of oxide nanopowders in optics, electronic, and in cosmetics for UV protection is well established.

It is well known that a decrease in particle size results in enhanced sintering kinetics of particulate materials. When particle size reaches the nanometer range, full densification is often possible at substantially lower temperatures than those needed for sintering coarse-grained particulates. This is because nanoparticles imply shorter diffusion lengths while promoting boundary diffusion mechanisms. In addition to savings in energy, lower sintering temperatures also result in reduced contamination, stresses and cracking during cooling.

The enhanced sintering kinetics of nanoparticulate materials are already exploited in the microelectronic packaging industry, where metal alloy nanopowders are incorporated in cold-weldable welding pastes to achieve ductile and electrically conductive metal to metal bonds.

In the refractory metal industry, a decrease of several hundreds of degrees in the sintering temperature is achievable when standard 2 $\mu$m tantalum powder used to produce tantalum capacitors is replaced with a 50 nm nanopowder.

Aside from geometric considerations, the prefix 'nano' also implies dramatically improved material properties as inferred from the well-known Hall-Petch relationship according to which a material's strength increases proportionally to the inverse square root of its grain diameter.

Hence, interest has been growing in nanoparticulate materials stemming from the fact that novel phenomena are being discovered at the nanoscale level, and there is immense potential for improving structural and functional properties of components and devices by 'nanostructuring' as nanostructures can generate superplastic or ultra-high strength, tough materials. Extrapolations based on reducing grain size have produced forecasts of 2–7 times higher hardness and 2–3 times the tensile strength of parts produced from conventional powders.

For example the yield strength of an 80 nm iron nanopowder sintered to 99.2% of theoretical density is about 2.4 GPa, roughly five times that of conventional iron with a particle size in the 25 $\mu$m range.

The improved material properties of nanostructures have already found applications in many different fields of industry and technology. For example nanograined powders are already used in hydrogen storage technology. Another fast growing field of application is that of nanopowder-polymer composites for microelectronic applications. Using metallic nanopowders dispersed in polymers allows the fabrication of electrically conductive adhesives, radio frequency shielding polymers, and magnetic polymeric layers. Another area of strong interest is the fabrication of lightweight electrical wires using conductive nanopowders in a polymer matrix. These extrinsically conductive polymer wires with nanoparticulate fillers exhibit improved electrical percolation. Since the volume of filler material needed to provide conductivity can be reduced by over 50%, the intrinsic flexibility, strength and toughness of the polymer matrix material is retained.

The use of nanopowders as reinforcing phase in nanocomposites is a fast developing technology where the vastly increased interfacial area between the nanoparticles and the matrix material leads to improvements in the amount of energy absorbed during mechanical stress. This is especially useful in applications such as ballistic armor protection, where improved energy absorption under high strain rate conditions leads to increased ballistic impact resistance. Furthermore the reduction in the amount of filler phase necessary to reinforce the polymer matrix reduces overall component weight.

The fine size of nanoparticulates also allows for the design of strengthened optically transparent components such as aircraft canopies. In this case the nanoparticle reinforcing agent is so fine that interference with the wavelengths of the visible light spectrum is minimized or eliminated.

Another exciting field of application is that of lithium ion batteries where nano-vanadium pentoxide has been shown to possess electrochemical properties that are different from those of commercial coarse-grained $V_2O_5$ powders, and these properties can be attributed to the structure of the nanoparticles. The discharge-charge voltage curve of nano-$V_2O_5$ is continuous whereas, in contrast, coarse-grained $V_2O_5$ has a stepwise curve which is unsuitable for lithium ion batteries. For the same number of discharge charge cycles, the capacity of nano-$V_2O_5$ is 60% higher than that of commercial powder. Furthermore irreversible losses are also much smaller when using nano-$V_2O_5$.

In the area of materials joining, copper, gold, nickel, tin and solder powders are routinely formed into pastes and used for electronics interconnects. The pastes are printed on ceramics such as aluminum oxide, and more recently aluminum nitride, to produce highly dense, so called thick film circuits. The requirement to shrink circuits and increase functionality has resulted in a continuing search for new and improved processes. One of the latest developments is in copper based pastes that can be applied to ceramic substrates at temperatures substantially below those currently used to manufacture thick film circuits. Lower temperatures are desirable because many electronic components are degraded by excessive temperatures. The lower sintering temperatures also allow environment-unfriendly lead based solder pastes to be phased out. Nanoparticulate-based joining formulations offer the potential to tailor the metallurgy and to lower the brazing temperature.

Nanoaluminum powders are also advantageously used in solid propellant formulations, doubling the burning rate as compared with that of compositions based on micrometer size aluminum. High burning rates increase thrust and speed of response. Adding nanoaluminum to hydrogen and kerosene burning with liquid oxygen increases the amount of energy released, resulting in smaller fuel tanks and shorter, lighter weight rockets.

There are many methods to produce nanopowders, most of them recent developments. Conventional powder fabrication techniques such as gas or water atomization fail in the submicrometer range, as they usually have a lower particle size limit of 1–5 $\mu$m. The past decade has seen significant effort in developing technology for synthesizing and processing materials at the nanometer scale.

One of several newer approaches is the inert gas condensation (IGC) method, which consists of evaporating and condensing the respective material in a vacuum chamber with a low partial pressure of inert gas (e.g. 10 mbar helium). With IGC, high quality powders with low chemical impurity levels and low contents of oxides or nitrides from the production process can be produced.

In a variation of this process metal particles are embedded in an organic matrix by evaporating both the metal and an organic liquid in the same vacuum vessel and subsequent co-condensation of the metal and the organic vapor under inert gas or vacuum. This process allegedly enables production of metal particles without agglomeration or oxide layers in an organic suspension. Particle size distribution is narrow, with a mean particle size in the range 2–50 nm.

Another process, the flame or plasma reduction method, uses the decomposition and reduction of metal salts in a gas flame or plasma. Sodium reduction of halides has been standard industrial practice for decades for synthesizing materials like titanium and zirconium. In one variation, the sodium/halide flame and encapsulation (SFE) technique uses sodium reduction of metal halides to produce the metal or, if the reaction occurs in the presence of a non-metal, a ceramic. The byproduct of the chemistry is salt, typically sodium chloride, which is used to encapsulate the particles within the flame.

Other processes include the chemical vapor reaction (CVR) method, which uses the reaction of metal chlorides and hydrogen in a hot wall reactor and the combustion flame chemical vapor condensation (CF-CVC) process. The latter purportedly has the ability to minimize the extent of particle aggregation. Still other techniques used are the pulsed plasma jet process and the electro-explosion of wire (EEW) process where an electrical pulse is applied to a wire.

Finally, mechanical milling or attriting, probably the oldest and best known of comminuting techniques, can produce large quantities of nanocrystalline materials with grain sizes below 100 nm from commercial coarse-grained metallic or ceramic powders as the starting materials. Mechanical milling is attractive because it has the advantage of being a simple and inexpensive process usually performed at room temperature and which can be readily scaled up for mass production.

Virtually all the problems in the production and processing of nanopowders stem from their high reactivity and worsen with decreasing particle size.

As the main quality issue, the pick-up of oxides or nitrides during processing or storage can be a serious problem. In most cases the incorporated oxygen has deleterious effects on the mechanical properties of the end product. To reduce contamination, nanopowder production and consolidation operations are mostly performed under inert gas atmosphere.

The purity requirement of nanoparticulate materials is application dependent as well. For advanced materials a specification of total metallic impurities less than 100 ppm is common.

Nanoparticulate materials have a strong tendency to form aggregates or agglomerates—most authors use the terms indiscriminately—which have a deleterious effect on powder processibility and end product quality. This is particularly relevant in applications such as rechargeable batteries, where a high packing density of the nanoparticulates is essential.

The high reactivity of nanoparticulate materials also leads to undesirable grain growth. The driving force for grain growth increases as grain sizes decreases, such that the advantage nanophase materials have in sinterability can be lost due to concomitant grain growth that destroys the desirable nanoscale grain size, defeating any efforts to form nanostructures.

Therefore, to maintain nanoscale grain size, consolidation temperatures often have to be limited to below 600° C., and typically to the 400–500° C. range.

Early work on the consolidation of metallic nanophase powders employed exotic techniques, such as shockwave compacting, to overcome the difficulties in maintaining nanophase grain size. Subsequent attempts using various techniques such as hot pressing, hot extrusion, sinterforging, hipping, etc. produced consolidated products that are either porous (around 90% of theoretical density), or fully dense but at the expense of the nanophase microstructure.

Virtually all nanoparticulate materials are pyrophoric and must be handled and shipped as hazardous materials. Materials that are relatively stable as micrometer-sized powders can become dangerously explosive when in nanopowder form. Even when the powders do not react violently they may still pick up excessive oxygen, which usually makes their properties less desirable.

The cost of nanoscale powders is presently in the hundreds of dollars per kilogram range. While substantial reductions in cost are anticipated as nanotechnology develops, nanopowders will always be more expensive to produce than micrometer sized powders and entail much higher shipping and handling costs.

The production rate capabilities of any specific nanopowder production process and the stringent material specifications such as the primary particle size, size distribution, purity and extent of aggregation, are of paramount importance in determining the cost of the nanopowders. In the end powder cost which will ultimately be the decisive factor in determining whether nanomaterial-based commercial applications can be economically competitive.

In short, although there are numerous methods for producing nanopowders, most are not practical from a commercial perspective.

The powders must not only be of the desired size and morphology but also stable in air so that they can be handled and processed without excessive oxygen contamination or safety risks. Methods to avoid contamination and aggregation should be consistent with conventional industrial practices of the powder processing industry. For example, it would be impractical to require that nanopowders be continuously handled and processed in ultrahigh vacuum. Also the need to eliminate impurities, contaminants or aggregates can dramatically increase powder cost. For instance, salt encapsulation, used to protect nanoparticles produced by the sodium/halide flame and encapsulation (SFE) technique, imperatively requires that the salt be removed during subsequent processing using water, ammonia, an appropriate solvent or even vacuum sublimation at 700° C.

BRIEF SUMMARY OF THE INVENTION

In accordance with the present invention the problems of the prior art are substantially overcome by providing an economic process to generate optimally-sized nanopowders substantially free of aggregates and contamination, while reducing or eliminating the risks associated with their inherent pyrophoricity, and integrating said process in subsequent consolidation techniques for mass-production of dimensionally accurate nanostructures for commercial use.

OBJECTS AND ADVANTAGES

It is a primary object of this invention to provide an integrated method for the fabrication of nanoparticulate materials free from aggregates and contamination.

It is another object of this invention to provide an integrated method for the fabrication of fine-grained nanostructures, substantially free from contamination and impurities. The fine-grained nanostructures are produced by first shaping green parts from an optimized dispersion of said aggregate and contamination-free nanoparticulates in a thermoplastic binder. All process steps, from dispersing the nanoparticulates into the organic binder through removal of the organic binder from the green parts to sintering of the resulting binder-free performs are performed contiguously and under protective atmosphere. The fine grain microstructures are achieved by sintering at the lowest possible temperature. At no time during this manufacturing process are the nanoparticulates or green parts exposed to temperatures which would promote excessive grain growth.

It is a particular object of this invention to provide a manufacturing process for nanostructures that are substantially sodium-free. This is a critical requirement for many applications in the microelectronic and semiconductor industry.

It is yet another object of this invention to provide a manufacturing process for nanostructures with improved dimensional accuracy.

It is still another object of this invention to provide an economic manufacturing process for nanostructures which lends itself easily to automation and mass-production and makes use of well-known prior art techniques such as casting, machining, molding, sintering, etc. It is therefore also an object of this invention is to provide a manufacturing method for nanostructures which is easily accessible to the nanufacturing industry instead of being restricted to specialized industries, laboratories and academic establishments. Hence, through this invention the world of nanotechnology will be opened to a wider number of practical users.

Still another object of this invention is to provide a method to optimize the selection and use of surfactants for nanoparticulate materials.

Also an object of this invention is to provide a method for controlling aggregation of nanoparticulate materials.

It is a further object of this invention to provide a method to optimize the dispersion of nanoparticulate materials in a thermoplastic organic matrix or binder.

An additional object of this invention is to provide a method to control the pyrophoricity inherent in nanoparticulate materials.

Still another object of this invention is to provide a method to fabricate nanostructures without the cost and material limitations inherent to the prior art. Through the use this invention nanostructures can be produced from a virtually unlimited number of material compositions.

BRIEF DESCRIPTION OF THE SEVERAL VIEWS OF THE DRAWINGS

Not applicable.

DESCRIPTION OF THE PREFERRED EMBODIMENTS

Though nowadays, nanoparticulate materials can be obtained from a number of powder suppliers, commercially sourced nanopowders will invariably display some or all of the aforementioned imperfections to various extent, depending upon their particular method of production. At this particular point in time, this situation constitutes nanotechnology's most serious impediment to large scale commercialization.

The first step then, in the application of the present invention, consists of sourcing raw precursor particulate materials that conform as closely as possible to the desired end specification of the nanoparticulates in terms of composition, morphology, granulometry, absence of aggregation, contamination, etc.

The raw precursor particulate materials may be made up of a single material, such as a ceramic or a metallic powder, or several different ceramic or metallic materials, either in elemental or prealloyed form, or even mixtures of these. The main directives in selecting the type of raw precursor particle materials will be the desired composition of the end product.

The next step consists of mechanically milling or attriting a predetermined volume of raw precursor particulate materials under a protective blanket of a non-aqueous organic heavy liquid, selected on the basis of its high density, low viscosity, low surface tension, chemical inertness, low cost, low toxicity, and safety of use. Examples of organic heavy liquids are given below, together with their respective density in $g/cm^3$:

| | | |
|---|---|---|
| Dichloromethane (methylene chloride) | $CH_2Cl_2$ | 1.325 |
| Chloroform | $CHCl_3$ | 1.492 |
| Carbon tetrachloride | $CCl_4$ | 1.594 |
| Diiodomethane | $CH_2I_2$ | 3.325 |
| Tetrabromoethane (TBE) | $C_2H_2Br_4$ | 2.950 |
| Trichloroethylene (TCE) | $C_2HCl_3$ | 1.460 |
| Trichlorotrifluoroethane | $C_2Cl_3F_3$ | 1.560 |
| Tetrachloroethylene (perchloroethylene) | $C_2Cl_4$ | 1.623 |

The ball mill or attritor charge will normally consist of the proper type and quantity of grinding media, usually ceramic balls or pebbles, the raw precursor particulate materials to be milled, and an appropriate volume of a protective organic heavy liquid. Following closure of the ball mill or attritor the supernatant volume of air inevitably present in the ball mill or attritor is displaced with an inert gas.

During the ball milling or attriting step, the raw precursor particulate materials are comminuted while any aggregates will be systematically broken down by the severe mechanical shearing action. Moisture or other contaminants such as gases or volatiles adsorbed onto the surface of the particulates will be dislodged and tend to collect at or above the surface of the organic heavy liquid.

After an empirically determined time, the ball milling or mechanical attrition action is stopped, interrupted or slowed down to allow dislodged gaseous contaminants to coalesce, collect or condense at or above the surface of the organic heavy liquid where they can be easily siphoned off or displaced by a stream of inert gas. The supernatant gases and coalesced or condensed contaminants can also be drawn off by applying a vacuum, and their volume replaced with additional organic heavy liquid. Alternatively the decanted, deaggregated and comminuted nanoparticulate materials can be transferred to another vessel filled with the organic heavy liquid. Whatever the method used, the end objective of this process step is to isolate the deaggregated and comminuted nanoparticulates from any atmospheric contaminants.

In the next step of the application of this invention the organic heavy liquid is pumped off and any residual organic heavy liquid removed by vacuum distillation. The use of vacuum at this stage is necessary to allow the desorption process to proceed to completion. Usually this requires a pressure of less than $10^{-6}$ Torr. When the base pressure stabilizes the desorption step will be completed.

Now that the first objective in the application of this invention, i.e. the preparation of nanoparticulates having the proper granulometry and clean desorbed surfaces, has been attained, it is opportune to outline the principles governing the remaining steps of the methodology pursued, bearing in mind that the ultimate goal is the fabrication of commercial nanostructures which implies meeting following criteria:

Throughout the entire process the nanoparticulates must be protected from contaminants.

The nanoparticulates must be prevented from re-aggregating before being put into the desired end configuration.

Grain growth during densification must be minimized.

The material properties of the end products must be optimized.

The end products must be dimensionally accurate.

The manufacturing process must be economical, repeatable and amenable to mass production.

Using the present invention, above criteria can all be met by first dispersing the nanoparticulates in an organic thermoplastic matrix or binder, to yield a thermoplastic compound from which green parts can be shaped via any suitable plastic shaping technique such as casting, injection molding, laminating, extrusion, etc. Following extraction of the organic binder from the green parts, same can be sintered in accordance with the practices of the prior art and under optimum conditions to result in dense end products.

Naturally, the densification will be concomitant with part shrinkage and the resultant end product will be a miniature of the original green configuration. A larger quantity of thermoplastic binder in the green part will cause a corresponding larger shrinkage upon sintering. As it is desirable to minimize shrinkage during sintering in order to improve control over the final dimensions of the sintered end product, it is crucial to minimize the quantity of organic binder, or the converse, to maximize the quantity of nanoparticulate materials in the dispersion.

Dispersions of particulates in an organic matrix or binder are characterized by the volumetric ratio of the discrete phase—in this case the nanoparticulate materials—to the total volume of the dispersion—in this case the thermoplastic matrix or binder. This ratio, usually termed the volumetric loading, volume occupancy or simply the loading of the dispersion, is often designated by the Greek letter $\Phi$. Minimizing part shrinkage during sintering, therefore, equates to maximizing $\Phi$.

In a theoretical situation of uniform spherical particles—often dubbed the canon ball theory—the maximum volume occupancy, $\Phi_{max}$, is achieved when the particles are orderly stacked in a close-packed arrangement, corresponding to a volume fraction of approximately 0.74. In a real world environment however, this idealized situation is unlikely to ever occur as the particles will neither be spherical nor uniform. Also, in the case of a wide particle size distribution or a multimodal distribution, i.e. a mixture of particles each with their own different particle size distribution—smaller particles will inevitably lodge in the space between bigger ones and $\Phi_{max}$ can be substantially higher than 0.74 as a result of interstitial filling.

For each specific situation, therefore, a condition known as the most probable volume fraction, $\Phi_m$, exists. This is the volume the particles will attain when they are being uniformly compressed in the dispersion as in the case of sedimentation and, for this reason, $\Phi_m$ is also termed the most probable sedimentation volume. As the particles begin to contact each other during sedimention they will form a structure that will eventually prevent further compression. When the particles are in this condition they are at $\Phi_m$. As no direction is given to any of the particles while they are being compressed, i.e. the compression is random, the final structure can be any one of a large number of discrete configurations, each corresponding to a particular value of $\Phi_m$. Hence, the problem of minimizing the shrinkage upon sintering now reduces to maximizing $\Phi_m$.

However, maximizing $\Phi_m$ for dispersions of extremely small particulates such as nanopowders is rendered difficult due to the high surface activity of the filler materials. Also the dispersion must retain acceptable rheology for subsequent shaping of green parts. When $\Phi_m$ increases so will the viscosity of the dispersion and, at a certain point, become impractical for shaping green parts.

When particle size is reduced to the nanometer scale and the distance between particles is of the same order of magnitude or even smaller, the effect of the net attractive van der Waals intermolecular forces must be taken into account when attempting to maximize $\Phi_m$ as these forces are responsible for particle aggregation and have a profound and often decisive effect on $\Phi_m$ and the processibility of nanoparticulate dispersions.

The effect of the van der Waals attractive forces is best illustrated by the well known Lennard-Jones curve, which gives the potential energy between particles as a function of interparticulate separation. Attraction due to van der Waals forces decreases very slowly with increasing particle separation and, at a distance in excess of 10 nm, becomes weak enough to be negligible. The opposite situation is attained when particles move together within atomic proportions, at which moment strong electrostatic repulsive conditions prevail. Between these two extremes the Lennard-Jones potential energy curve goes through several maxima and minima (energy wells) depending on a number of variables specific to the surface conditions of the particulates and the continuous phase between them. At the minima of potential energy the particles will find themselves at an equilibrium distance and either moving them closer to each other or further away from each other will require an input of energy. It is at such minima that a dispersion of nanoparticulates in an organic matrix will form stable aggregates. The stability of such aggregates will be proportional to the magnitude of the minima in the Lennard-Jones curve, i.e. the 'deeper' the potential energy well, the more stable the aggregates will be.

Since aggregates behave like particles, the most probable maximum packing volume $\Phi_m$ of any dispersion will be dramatically affected by the degree of aggregation of the system. It is clear that, in order to break down aggregated nanoparticulates, the mechanical energy input, such as the shearing action from ball milling or mechanical attrition, must be sufficient to overcome the potential energy minima. If the energy input is interrupted or insufficient, the particulates may be moved a short distance away from their equilibrium position, i.e. the aggregates may momentarily de-aggregate, but they will soon re-aggregate. Since it is always possible to provide sufficient energy for de-aggregation, the key to success resides in preventing re-aggregation. It is one of this invention's objects to provide this key and thus, indirectly, to control the van der Waals forces acting on the particles in the dispersion.

The technique consists of coating at most 50% of the surface of the nanoparticles with a monolayer of surfactant molecules immediately after the aggregates have been broken down by the mechanical milling action and the surfaces of the nanoparticulates desorbed. When a monolayer of surfactant molecules is adsorbed onto the surface of the adsorbent, the atomic radius of surface atoms in contact with the adsorbate increases, sometimes by as much as 20%, and these absorbent atoms are no longer able to assume the equilibrium position they occupied during nanoparticle aggregation.

The method used to select the type of surfactant and to determine the optimum amount of surfactant will now be disclosed.

It will be remembered from surface adsorption theory that a distinction is usually made between two different types of adsorption: physical or van der Waals adsorption, also termed physisorption, and chemical adsorption or chemisorption.

In physisorption, the London—van der Waals mutual forces of attraction cause the adsorbing (adsorbate) molecules to be attracted to and held in the vicinity of the adsorbing (adsorbent) surface (adsorbent). Physisorption does not stop when a single layer of molecules has been adsorbed but continues through many stacked layers of adsorbed molecules.

Chemisorption initially proceeds in the same manner as physisorption except that the adsorbate and adsorbent are chemically reactive. Thus the first monolayer of chemisorbed molecules is, for all practical purposes, the total extent of chemisorption, and any succeeding layers are physisorbed. Like any other chemical reaction chemisorption requires a minimum activation energy. The general rule is that low temperature (under the boiling temperature of the adsorbate) indicates physisorption, intermediate temperature indicates chemisorption, and high temperature indicates desorption. For example, CO gas will physically adsorb on a given adsorbent at 80° K. When the temperature is increased to 350° K it will chemisorb and at 1200° K it will desorb. Temperature is, therefore, one of the important parameters in controlling the type of adsorption.

Chemisorption is also highly specific because it is a chemical reaction. A given adsorbate may readily chemisorb on an adsorbent under one set of conditions and may not chemisorb at all under a slightly different set of conditions. Physisorption, on the other hand, takes place on all surfaces under the right temperature-pressure conditions, being essentially independent of the chemical nature of the adsorbate. It has been found that the heat of physical adsorption is always near the heat of liquefaction of the adsorbate.

Hence, in the application of this invention, upon completion of the vacuum distillation step, as indicated by a stable base pressure, a predetermined volume of a suitable surfactant is admitted into the ball mill, attritor or vessel, and allowed to physisorb onto the surface of the nanoparticulates. This obviously implies that the nanoparticulates be maintained at a vacuum level below the vapor pressure of the surfactant—which will inherently be the case if the surfactant is admitted into the ball mill, attritor or vessel containing the desorbed comminuted nanoparticulates, immediately following the desorption step—and at a temperature at which physisorption will occur.

The choice of a specific surfactant is made on the basis of minimizing the c constant in the BET isotherm. It may be opportune, at this stage, to recall that the BET isotherm is usually written as:

$$P/v(P_o-P)=(1/v_m c)+[(c-1)/v_m c].P/P_o$$

where P is the system pressure $P_o$ is the saturation vapor pressure of the condensed adsorbate V is the volume of gas adsorbed $V_m$ is the volume of a monolayer of the adsorbate c is a constant that depends on the net heat of adsorption such that:

$$c \sim \exp(\Delta H_a - \Delta H_d)/RT$$

where $\Delta H_a$ is the enthalpy of adsorption (condensation)

$\Delta H_d$ is the enthalpy of desorption (evaporation)

R is the gas constant

T is the absolute temperature of adsorption

Since the BET isotherm in its above form is a linear equation, a plot of $P/v(P_o-P)$ against $P/P_o$ gives a straight line. The ratio of its slope to its intercept is (c−1) so that c can be readily evaluated from experimental data.

Although the BET isotherm is primarily used to measure the surface area of particulate materials and, to this effect, an inert gas such as nitrogen, helium, xenon, krypton, ethylene, etc. is generally used as the adsorbate, the technique can also be used with many other gaseous molecules such as oxygen, alcohols, mineral oils, fatty acids, etc. For any given particulate material used as an adsorbent, an adsorbate-specific constant c can be derived from the corresponding BET isotherm.

Results obtained with an aluminum powder having an average particle size of 6 $\mu$m are given below:

| Adsorbate | Value of c (BET) | $\Phi_m$ |
| --- | --- | --- |
| None (desorbed aluminium surface) | 800 | 0.30 |
| Oxygen | 80 | 0.45 |
| Isopropyl alcohol ($C_3H_7OH$) | 35 | 0.55 |
| Phospatidylcholine | 23 | 0.63 |

As can be seen from above tabulation, when the clean aluminium powder is coated with a monolayer of phospatidylcholine, $\Phi_m$ jumps from 0.30 to 0.63, a 110% improvement. Further studies have also shown that it is not necessary to coat the entire surface of the nanoparticles with a monolayer of surfactant. When only 50% of the surface receives a monolayer of surfactant $\Phi_m$ already reaches a maximum.

The minimum volume of surfactant to be adsorbed can be determined on the basis of the specific surface area of the comminuted nanoparticulate materials, as measured by the BET method, so that at most 50% of the adsorbent's surface will be covered with a monolayer of adsorbate molecules.

When the nanoparticulates have been coated by the surfactant in accordance with above teachings, they can be dispersed in a predetermined volume of the organic matrix or binder. The thermoplastic matrix or binder is made up of at least one thermoplastic organic material though generally it will be made up of several different organic constituents which may include polyolefin resins, silicones, waxes, oils, greases and the like. In most cases various organic plasticizers and antioxidants will also be included to optimize the characteristics of the thermoplastic matrix and to avoid or retard its premature oxidative degradation. Usually the binder will be specifically formulated for a given discrete phase to optimize the thermoplastic compound's rheological properties and the thermal decomposition pattern of the organic binder. Anyone skilled in the art will be well aware of the number of combinations and permutations possible at this point to obtain the desired characteristics of the organic binder. Enumerating such possibilities would not materially contribute to the description of this invention. However, a typical formula for the organic matrix would be approximately one-third by weight of polyethylene, one-third by weight of paraffin wax, one-third by weight of beeswax with perhaps 0.05% of an antioxidant added.

The surfactant-coated nanoparticulates and the thermoplastic matrix or binder are admixed under a protective oxygen-free atmosphere at a temperature in excess of the melting point or flow point of the thermoplastic matrix but below the temperature at which sintering of the nanoparticles will be initiated. Techniques for producing thermoplastic compounds are well described in the prior art and will not be elaborated on here.

The thermoplastic or green compound is formulated in such way that it is a solid at or below the normal room temperatures prevailing in temperate climates, i.e. usually below 25 degrees Celsius. At such temperatures the green compound can be machined by well-known techniques such as milling, drilling, turning, reaming, punching, blanking, sawing, cutting, filing, etc.

The organic binder is further formulated in such way as to be extractable from the thermoplastic compound using well-known techniques such as aqueous or organic solvent extraction, oxidative degradation, catalytic decomposition, vacuum distillation, wicking and the like, leaving behind a framework that is substantially devoid of organic material and consisting only of the particulates of the discrete phase, coherently held together by the net attractive van der Waals forces. At this point in the process the shape is extremely fragile.

The binder-free nanostructure is then sintered to its final dense end configuration in accordance with prior art practices. The use of microwave sintering may be appropriate to obtain rapid densification while preventing excessive grain growth.

Finally, by combining the teachings described in this disclosure with those expounded in the inventors' co-pending U.S. patent application Ser. No. 09/962,526 filed on Sep. 20, 2001 entitled: 'Method For Controlling The Dimensions Of Bodies Made From Sinterable Materials', nanostructures of high dimensional accuracy may be obtained.

CONCLUSION, RAMIFICATIONS AND SCOPE

In conclusion, the major advantage of this invention resides in the ability to produce nanostructures with improved material properties, economics and to tighter dimensional tolerances from a wide range of materials including metals, ceramics, cermets and alloys and many other sinterable materials.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim as our invention:

1. A method for producing a body from nanoparticulate material, comprising the steps of:

a. providing at least one type of sinterable precursor nanoparticulate material, b. attriting a predetermined volume of said precursor nanoparticulate material or materials under a protective non-reactive fluid blanket having substantially higher density than that of water, and breaking up any aggregates and mechanically removing any adsorbed volatiles, moisture, atmospheric gases or contaminants from the surface of said nanoparticulates or from the fresh surfaces generated during attrition, c. separating any contaminants thus removed from the deaggregated nanoparticulates, d. removing the protective fluid blanket from the decontaminated nanoparticulates using vacuum distillation, e. desorbing the surface of the nanoparticulates by applying a sufficiently high vacuum, f. allowing a predetermined volume of a suitable surfactant to adsorb onto the surface of the said desorbed nanoparticulates such that at most 50% of the nanoparticulates' surface will be coated with a monolayer of said surfactant, g. dispersing said surfactant-coated nanoparticulates in a predetermined volume of a suitable degradable organic thermoplastic binder to form a homogeneous thermoplastic compound h. shaping said thermoplastic compound into a green body, i. extracting substantially all of the organic thermoplastic binder from from said green body and sintering the thus obtained organic-free preform.

2. The method of claim 1 wherein the said nanoparticulate materials are selected from the class of metals and their alloys, ceramics and their alloys and mixtures of metals and ceramics and their alloys.

3. The method of claim 2, wherein said nanoparticulate materials are selected from the group consisting of metal oxides, carbides, borides, nitrides, silicides, aluminas, mullite, and zeolites.

4. The method of claim 1 wherein the said degradable organic thermoplastic binder ingredients are selected from the class of polyolefins, waxes, plasticizers, greases, oils, surfactants and mixtures of these.

5. The method of claim 1 wherein the formation of aggregates is reduced or prevented.

6. The method of claim 1 wherein the pyrophoricity of nanoparticulates is controlled.

* * * * *